Patented Oct. 19, 1937

2,095,966

UNITED STATES PATENT OFFICE

2,095,966

ELECTROLYTE AND METHOD OF MAKING SAME

Joseph B. Brennan and Emma Leona Marsh, Fort Wayne, Ind.; said E. Leona Marsh assignor to said Joseph B. Brennan No Drawing. Application December 27, 1934, Serial No. 759,433

19 Claims. (Cl. 175—315)

This invention relates to electrolytes and more particularly to viscous or paste type electrolytes for use in electrolytic condensers embodying filmed electrodes of aluminum or other film forming material.

An object of our invention is to provide an improved film maintaining electrolyte. Another object is to produce an electrolyte which will retain its characteristics through a wide range of temperatures. Another object is to provide an electrolyte which can be adapted to various types of condensers. Another object is to provide an electrolyte which will withstand relatively high voltages and which will not be decomposed by heating. Another object is to provide an electrolyte which will produce condensers having a high capacity per unit of electrode area. Another object is to provide an electrolyte having low resistance and which will produce condensers having low power factor losses.

Other objects and advantages will appear from the following description of a preferred form of our invention. The essential characteristics are summarized in the claims.

We have found that we are able to attain the objects stated above by employing as the electrolyte a partially reacted condensation product of formaldehyde and urea having a film forming and maintaining salt incorporated therein. Under ordinary circumstances, formaldehyde and urea react to form a hard transparent synthetic resin known as "pollopas". However, we have found that by the addition of ammonium hydroxide and a weak acid, such as boric acid or other film maintaining acids, which react to produce a weakly ionized ammonium salt, the condensation of urea and formaldehyde can be inhibited and the complete hardening or resinification can be prevented, thus producing a viscous or pasty solution embodying a film maintaining ammonium salt and suitable for an electrolyte in electrolytic condensers. The electrolyte may be stabilized by the addition of an alkaline earth hydroxide, and the resulting product is soluble in various organic solvents which may be used to control the viscosity of the electrolyte.

Our investigations indicate that other aldehydes can be employed with urea in combination with an ionized salt to produce a suitable condensation product. Likewise other amides of carbonic acid may be employed in the production of the electrolyte. However, the compounds which might be substituted for urea and formaldehyde, such as thiourea and acrylic aldehyde, are generally less available and more expensive, and accordingly we prefer to form our electrolyte from urea, formaldehyde and a weakly ionized salt. If desired, other weakly ionized film maintaining salts may be substituted for ammonium salts, such as corresponding salts of sodium or potassium.

In formulating the electrolyte, we have found the following procedure to produce the desired results: first, 50 grams of urea and 100 grams of boric acid are mixed with approximately 50 cc. of ammonium hydroxide 28%. This mixture is allowed to stand for a short time, say two or three minutes, and approximately 80 cc. of 37% formaldehyde or its equivalent are added, whereupon the mixture is heated to approximately 115° C., a clear solution resulting therefrom.

To the above described resulting solution we may add, before heating and after solution, a small quantity, as 20 cc. of an aqueous solution of an alkaline earth hydroxide, for example limewater. The result is an extremely stable mixture which may be readily incorporated into electrolytic condenser units with excellent results. Probably the alkaline earth hydroxide stabilizes the electrolyte while in use, the hydroxide functioning to absorb any carbon dioxide gas generated in use of the condenser.

Various organic solvents such as polyhydric alcohols containing ether groups may be used to reduce the viscosity of the electrolyte. For example, 30 cc. of diethylene glycol may be added to the solution produced as described above, or a mixture of glycerine and diethylene glycol may be employed, or glycol may be substituted for the above solvents. Various combinations of glycol, diethylene glycol, and glycerine will give satisfactory results. By adding different amounts of the organic solvents, the viscosity of the electrolyte can be varied so that the electrolyte can be adapted to various types of condensers.

Ordinary paste type condensers employing our electrolyte and having one or more aluminum plates provided with dielectric films in the usual manner will successfully withstand voltages of over 525 volts. Condensers embodying our electrolyte are suitable for direct current or alternating current installations. For alternating current installations, both electrodes of the condensers are preferably made of aluminum sheets or plates provided with dielectric films, while for direct current filter circuits, the one or more anodes are provided with dielectric films and the cathode or cathodes may be of non-filming metal such as copper. The electrolyte is particularly adapted for use in condensers comprising interwound or stacked sheets of aluminum foil, with permeable spacers between the surfaces of adjacent sheets. The interposed spacers are spread or impregnated with the electrolyte.

Our electrolyte produces condensers having low resistance and low power factor losses and high capacity per unit of urea. The leakage is low and the dielectric film is properly maintained, and promptly tends to reform after a breakdown due to excessive voltage. As a result of the low losses in condensers embodying our electrolyte, such condensers do not heat up excessively, and further our electrolyte is stable under a wide range of temperatures, the boiling point being approximately 115° C., while the electrolyte also retains its desired characteristics at low temperatures. Furthermore our electrolyte is made from relatively inexpensive materials, and the electrolyte can be readily manipulated and easily applied to condensers.

In the foregoing specification, we have described a preferred form of our electrolyte and a preferred method of producing it. Various changes and modifications, both in the product and method, all within the scope and spirit of our invention, will be evident to persons skilled in the art. It is to be understood therefore that our invention is not limited by the foregoing description or in any manner other than by the appended claims when given the range of equivalents to which our patent may be entitled.

We claim:

1. An electrolyte for electrolytic condensers consisting principally of a partially reacted condensation product of an amide from the group consisting of urea and thiourea and an aldehyde from the group consisting of formaldehyde and acrylic aldehyde.

2. An electrolyte for electrolytic condensers comprising as a principal ingredient a pasty condensation product of urea and formaldehyde.

3. An electrolyte for electrolytic condensers comprising as a principal ingredient a pasty condensation product of an amide from the group consisting of urea and thiourea and an aldehyde from the group consisting of formaldehyde and acrylic aldehyde having a film-maintaining salt incorporated therein.

4. An electrolyte for use in electrolytic condensers including as principal ingredients a partially reacted urea formaldehyde condensation product and a weakly ionized film-maintaining salt.

5. An electrolyte for use in electrolytic condensers including as principal ingredients a partially reacted urea formaldehyde condensation product, a weakly ionized film maintaining salt, and a solvent.

6. An electrolyte for use in electrolytic condensers including as principal ingredients a partially reacted urea formaldehyde condensation product, a weakly ionized ammonium salt as a condensation inhibitor, and an organic solvent therefor.

7. An electrolyte for use in electrolytic condensers including as principal ingredients a viscous urea formaldehyde condensation product and an absorption medium for the electrically formed gases thereof.

8. An electrolyte for electrolytic condensers including as a principal ingredient a solution of a condensation product of formaldehyde and urea in a polyhydric alcohol.

9. A method of making an electrolyte including the step of reacting an amide from the group consisting of urea and thiourea and an aldehyde from the group consisting of formaldehyde and acrylic aldehyde in the presence of a weakly ionized ammonium salt to produce a partially reacted condensation product.

10. A method of making an electrolyte including the steps of mixing a weakly ionized ammonium salt to an amide from the group consisting of urea and thiourea, adding an aldehyde from the group consisting of formaldehyde and acrylic aldehyde and an alkaline stabilizer to the mixture, and heating the complete mixture until a clear solution results.

11. A method of making an electrolyte including the steps of mixing urea, a weakly ionized ammonium salt, formaldehyde, and an alkaline stabilizer, and heating the mixture until a clear solution results.

12. A method of making an electrolyte including the steps of mixing urea, a weakly ionized ammonium salt, formaldehyde, and an alkaline stabilizer, and heating the mixture until a clear solution results, and thereafter adding a solvent comprising a polyhydric alcohol containing an ether group.

13. A method of making an electrolyte including the steps of mixing urea, boric acid and ammonium hydroxide in substantially the proportions of 50 grams of urea to 100 grams of boric acid to 55 cc. of 28% ammonium hydroxide, adding formaldehyde thereto substantially in the proportion of 80 cc. of 37% formaldehyde, and heating the mixture to about 115° C.

14. The method of inhibiting the reaction between formaldehyde and urea to prevent the complete resinification of the condensation product, including the step of mixing an ammonium salt of a film-maintaining acid to the urea and thereafter adding the formaldehyde to the mixture.

15. An electrolyte for electrolytic condensers including as principal ingredients a partially reacted condensation product of an aldehyde from the group consisting of formaldehyde and acrylic aldehyde and an amide from the group consisting of urea and thiourea, and a film-maintaining salt.

16. An electrolyte for electrolytic condensers including as principal ingredients a partially reacted condensation product of an aldehyde from the group consisting of formaldehyde and acrylic aldehyde and an amide from the group consisting of urea and thiourea, a weakly ionized film-maintaining salt, and an alkaline stabilizer.

17. An electrolyte for electrolytic condensers including as principal ingredients a pasty condensation product of an aldehyde from the group consisting of formaldehyde and acrylic aldehyde and an amide from the group consisting of urea and thiourea, and a stabilizer consisting of a hydroxide of an alkaline earth metal.

18. An electrolyte including as a principal ingredient a partially reacted condensation product of an amide from the group consisting of urea and thiourea and an aldehyde from the group consisting of formaldehyde and acrylic aldehyde, the reaction of which is inhibited before completion by a weakly ionized salt or acid, and stabilized by a solvent.

19. An electrolyte including as a principal ingredient a partially reacted condensation product of an amide from the group consisting of urea and thiourea and an aldehyde from the group consisting of formaldehyde and acrylic aldehyde, the reaction of which is inhibited before completion by a weakly ionized salt or acid and stabilized by an alkaline earth hydroxide.

E. LEONA MARSH.
JOSEPH B. BRENNAN.